United States Patent Office 3,254,715
Patented June 7, 1966

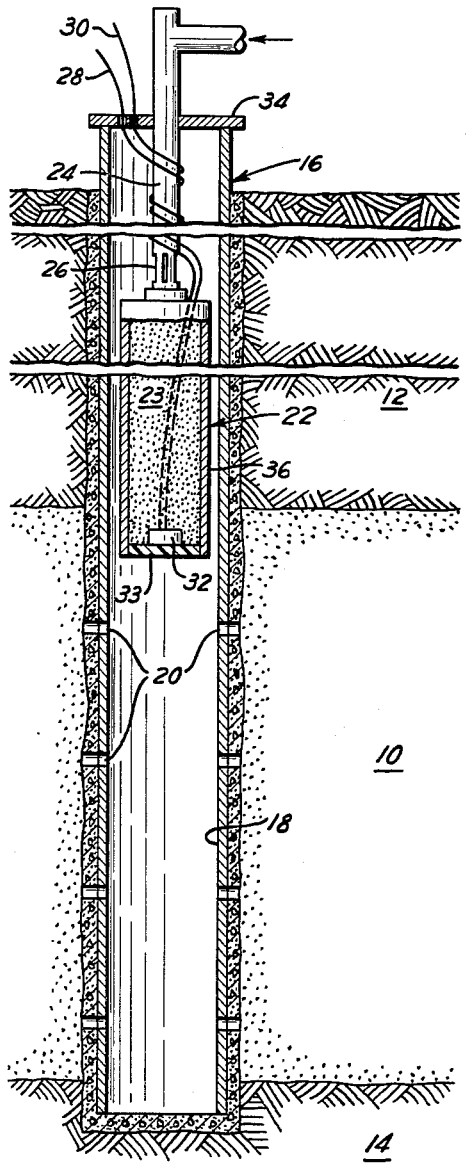
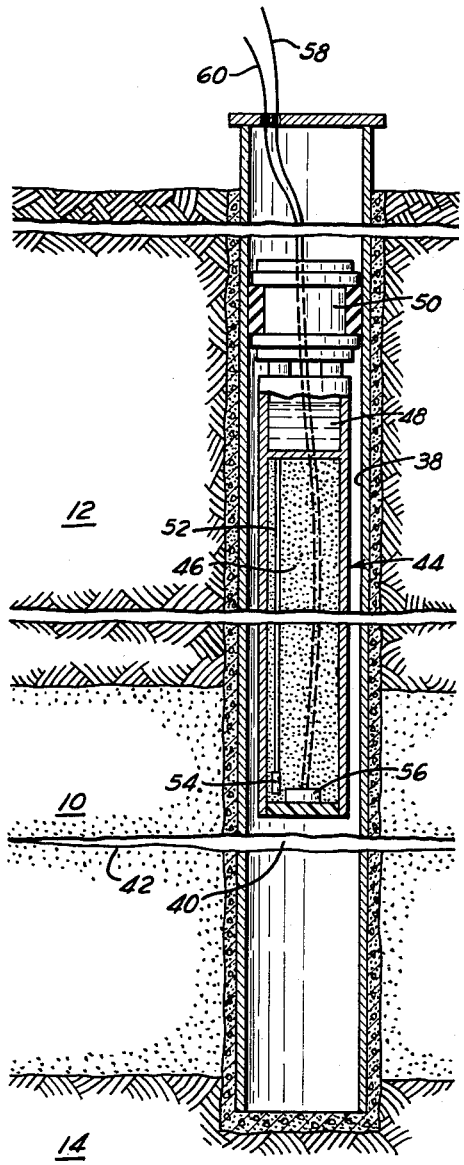
Fig. 1
Fig. 2
INVENTOR.
RICHARD A. MORSE
BY
ATTORNEY

3,254,715
PROCESS FOR CONSOLIDATING INCOMPETENT SUBSURFACE FORMATIONS
Richard A. Morse, Oakmont, Pa., assignor to Gulf Research & Development Company, Pittsburgh, Pa., a corporation of Delaware
Filed July 12, 1962, Ser. No. 209,321
9 Claims. (Cl. 166—25)

This invention relates to a method of consolidating incompetent underground formations and more particularly to a process for forming a permeable coke structure bonding together particles of a friable underground formation.

Oil is frequently found in incompetent formations in which the individual particles of the formation are not strongly cemented together. Such formations may vary rather widely in their characteristics from semisolid formations which are almost entirely uncemented to friable formations of some strength but incapable of withstanding the strong erosive effects of fluids flowing at a high velocity through the formation into a well penetrating the formation.

The flow of sand from incompetent formations into a well penetrating the formation during production of fluids from the well is objectionable for several reasons. The sand particles may plug tubing, liners, or other equipment in the well and prevent production of fluids through the well. If the incompetent formation is under a high pressure, the sand particles may travel through the well at a high velocity which causes serious erosion of tubing, valves, and other equipment. Removal of sand from weaker incompetent formations as a result of flow of sand into a well may cause the formation to collapse under the weight of the overburden and damage casing of the well.

Several techniques have been used to combat the flow of sand from incompetent formations into wells penetrating such formations. One method that has been used widely is to set a slotted liner in the borehole through the incompetent formation and thereafter pack gravel around the liner. The gravel provides support for the incompetent formation and additionally acts as a screening medium which prevents movement of solid particles toward the well.

Gravel packing is an expensive operation because of the cost of a liner and the rig time required for the several trips into a well to set and pack the liner. Moreover, gravel packing is not wholly effective because particles of the incompetent formation are not immobilized. Frequently, there is sufficient movement of fine particles from the formation to the linear to plug openings in the liner or, in some instances, to erode large openings in the liner; then it becomes necessary to rework the well and set a new liner. It has been the usual experience to find that each reworking results in a well of lower fluid flow capacity.

Another method that has been suggested for consolidating incompetent formations is to displace resin-forming chemicals into the formation under conditions such that the chemicals will react in the formation to form a solid resin film bonding the particles together. This method, like gravel packing, may be very expensive. The amount of resin-forming chemicals required to treat effectively the large volume of the incompetent formation surrounding a well is large, and even for the cheapest resins the cost of the chemicals is substantial. There is also substantial expense caused by the time and equipment required for the treatment. Moreover, the individual particles of the incompetent formation generally are coated with water or oil which interferes with adhesion of the resin film to the particles. Another disadvantage of the treatment with resins has been a marked decrease in the permeability of the formation after treatment with the resin.

It has been suggested that the particles of an incompetent formation may be bonded together by coking a hydrocarbon oil in place in the formation. The heat required to raise the temperature of the formation to a level at which coking occurs will vaporize water present in the formation and alter wetting characteristics of the formation and oil, and thereby improve adhesion of the coke to the particles of the formation. One method of bonding the particles with coke that has been suggested is to displace a hot inert gas from the borehole into the formation. The flow of hot inert gas through the formation raises the temperature of oil in the formation to a level at which coking occurs, and also insures retention of the formation's permeability. A difficulty with this method is in the delivery of hot inert gases into the incompetent formation. If a well bore burner is used to supply the heat, it is necessary to burn the fuel with an excess of oxygen to prevent the formation of substantial quantities of soot which would plug the openings in the incompetent formation. However, when an excess of oxygen is used in the burner, the hot oxygen in the combustion products burns the coke deposited in the formation around the well bore.

This invention resides in a process and apparatus for consolidating an incompetent formation containing a cokable oil around the borehole of a well in which a fuel containing an oxidant is burned in the borehole and the hot combustion products from the fuel are displaced into the surrounding formation to form a strong permeable structure of coke bonding the particles of the formation together. An essential characteristic of the fuel used in this invention is a substantial absence of oxidizing compounds or solid particles in the combustion products.

In the drawings:

FIGURE 1 is a diagrammatic illustration of a well, partially in vertical section, having casing extending through an incompetent formation to be consolidated by this invention in which the casing is perforated through the interval of the incompetent formation.

FIGURE 2 is also a diagrammatic illustration of an embodiment of this invention in which the incompetent formation is consolidated adjacent to a fracture extending from the well into the formation.

Referring to FIGURE 1 of the drawings, an incompetent subsurface formation 10 is shown between cap rock 12 and base rock 14. A borehole of a well, indicated generally by reference numeral 16, is drilled through the incompetent formation 10 and casing 18 is set in the borehole and cemented by conventional cementing techniques. Incompetent formation 10 may range from relatively hard but friable formations to soft semisolid formations. Adequate support to prevent collapse of incompetent formation 10 is provided by maintaining hydraulic pressure within the borehole during the drilling, running, and cementing of casing 18. In the embodiment of the invention illustrated in FIGURE 1, a plurality of perforations 20 is made in the casing 18 and surrounding cement sheath through the interval of the incompetent formation 10. Frequently it is preferable to perforate or cut a notch in the casing only over a relatively small portion of the incompetent formation to increase the certainty that the entire exposed portion will be treated adequately.

After the perforations 20 have been made in the casing, a capsule 22 filled with a fuel 23 is run into the well on the lower end of tubing 24. The capsule is suspended within the casing with its lower end a short distance above the uppermost perforation 20. Tubing 24 is slotted at 26 above the connection of the tubing to the upper end of capsule 22 for discharging a diluent in the manner hereinafter described. In the apparatus shown, electrical leads 28 and 30 are wrapped around tubing 24 and extend down to the lower end of the capsule for connection to a suitable igniter 32 in the lower end of the capsule 22 immediately above a frangible disc 33. A combination of a go-devil and igniter could be used for ignition. The upper end of the casing 18 is closed by a cap 34.

Capsule 22 comprises a waterproof container 36 adapted to protect the fuel 23 from well fluids as the capsule is run into the well. The container 36 may be of a plastic, which is consumed as the fuel 23 is burned, or may be of a metal such as steel, aluminum, or cast iron. If constructed of metal, casing 36 is preferably of a drillable metal such as aluminum or cast iron to permit its removal in the event it should drop from the tubing 24.

The fuel 23 contains a reductant and oxidant adapted to react, upon ignition, in a manner to yield a large quantity of heat in the form of hot gaseous reaction products substantially free of solid particles and oxygen or other oxidizing agents that would destroy coke formed by heating oil in the formation. A suitable source of fuels that can be used in this invention is rocket propellants. Solid rocket propellants are preferred because of their simplicity and low cost. Although rocket propellants provide a preferred source of fuel, this invention is not limited to the use of materials which have been found to be satisfactory as rocket fuels, but encompasses the use of any fuel which contains its own oxidizer in proportions such that the combustion products are non-oxidizing and do not contain solid particles.

Preferred fuels 23 are composite rocket propellants composed of a mixture of an oxidizer and a reductant. One group of reductants suitable for use are rubberlike combustible or plastic materials such as polysulfide synthetic rubbers, polyurethanes, polyvinyl chloride, polyethylene, polyesters, and synthetic rubber. The reductants are mixed with an oxidizing agent such as ammonium perchlorate or ammonium nitrate in proportions to avoid an excess of oxidizer sufficient to impair the strength of the coke. The requirement that an excess of oxidizer be avoided does not create any difficulties. Ordinarily, rocket propellants are compounded to avoid an excess of the oxidizer. Double-base rocket propellants such as the plastic type propellant prepared from nitro-cellulose and nitroglycerine are also suitable sources of fuel for use in this invention. Other rocket propellants suitable for use in this invention are described in "Rocket Propellant Handbook," by Kit and Evered, published by Macmillan Co., New York.

A slow burning rocket propellant is preferred as a fuel to avoid excessive buildup of pressure within the borehole. The burning rate of the propellant can be controlled by any of the techniques conventionally used for control of the burning rate of propellants for rockets. For example, the propellant can be in the form of grains which are coated with a slow burning material, generally referred to as an inhibitor. Propellants usually burn in a direction perpendicular to the surface which permits the rate of burning to be controlled by reducing the surface burning area of the propellant grains. A preferred arrangement for the propellant used in this invention is to cast the propellant as a single block within the casing 36.

Oil present in formation 10 may not be suitable for coking or oil may have been displaced from the vicinity of the casing in the incompetent formation 10 during the drilling of the well, and the setting of the casing 18. If so, it will be desirable to displace a readily cokable oil containing a high percentage of asphaltenes, such as a residual oil or a heavy crude oil, down through tubing 24 and perforations 20 into the incompetent formation 10. The cokable oil is followed by a suitable fluid such as an inert gas or water to clear tubing 24 of the cokable oil. Flow of an inert heat absorbing fluid, preferably nitrogen or water, is then commenced in tubing 24, and the igniter 32 is set off by an electrical current through lead lines 28 and 30 whereupon the igniter ignites the fuel 23 within the capsule 22.

Hot combustion gases produced by burning of the fuel 23 are mixed with the inert fluid delivered through tubing 24 and are discharged into the incompetent formation 10 through perforations 20. The rate of flow of the inert fluid though tubing 24 is controlled to maintain the temperature of the mixture of combustion products and inert fluid in the desired range. The mixture of gases entering the incompetent formation 10 through perforations 20 should be at a temperature of 500° to 1100° F., and preferably from 700° to 900° F. for best coking. Temperatures exceeding 1100° F. will destroy any bonding of the incompetent formation that may have occurred.

While the temperature control is illustrated in FIGURE 1 as being accomplished by the continued delivery of an inert fluid through tubing 24 for admixture with the combustion products from the fuel, other means of temperature control are suitable. For example, a material capable of absorbing as heat of vaporization a part of the heat of combustion of the fuel to provide a large volume of combustion products at a somewhat lower temperature may be incorporated directly in the rocket propellant. Suitable materials for this purpose, in addition to water, are liquid carbon dioxide and liquid ammonia.

One of the advantages of the process of this invention is that the flow of hot inert gases through the incompetent formation 10 during the formation of the coke insures the creation of a permeable material bonding the particles into a strong coherent mass. Moreover, the amount of heat that can be delivered into the incompetent formation 10 is virtually unlimited and will be determined only by the amount of fuel within the capsule 22. Capsule 22 can be made in a number of sections and can be made as long as necessary to supply the heat necessary to form coke for the desired distance around the borehole.

Frequently, formations designated as incompetent have substantial strength but are not capable of withstanding the large pressure drop of fluids flowing from the formation into the well. An embodiment of this invention suitable for use in a relatively hard incompetent formation is illustrated in FIGURE 2. A borehole of a well is drilled through the incompetent formation 10 lying between cap rock 12 and base rock 14, and casing 38 is set in the borehole in the manner described for the embodiment of the invention illustrated in FIGURE 1. Thereafter, a horizontal opening 40 is cut in the casing and a small horizontal fracture 42 is made in the incompetent formation 10 by conventional fracturing procedures. A capsule 44 containing a lower compartment 46 filled with a rocket propellant and an upper compartment 48 partially filled with water is run into the casing on the lower end of a hanger 50. Fast burning propellants could be used to generate sufficient pressure to create a fracture without a prior fracturing step. Hanger 50 is set in the casing in position to support the lower end of capsule 44 immediately above fracture 42.

A delivery line 52 extends from the upper compartment 48 down through the lower compartment 46. Line 52 may be constructed of either a metal or a combustible material and is closed at its lower end with a fusible plug 54. Above the surface of the water in compartment 48 is a gas under pressure adapted to provide a driving force for discharging the water from the compartment after ignition of the rocket propellant within capsule 44.

In the operation of the apparatus illustrated in FIGURE 2, an igniter 56 in the lower end of capsule 44 is set off by means of an electrical current delivered through lead lines 58 and 60. The rocket propellant within the capsule 44 is ignited and melts fusible plug 54 whereupon water is discharged from compartment 48 into the outwardly flowing stream of combustion products. Vaporization of the water reduces the temperature of the combustion products to the desired range of 500° to 1100° F. Ammonia, carbon dioxide, hydrogen chloride or sulfur dioxide also can be used as a coolant and have the advantage of changing the wetting characteristics of the formation. Such cooling fluids are designated as inert because, unlike oxygen, they do not destroy the coke of its bonding properties at temperatures of 500° to 1100° F. The mixture of combustion products and water vapor is discharged through notch 40 into fracture 42 and flows outwardly through the faces of the fracture into the incompetent formation 10 to heat the formation adjacent the fracture to a temperature at which oil present in the formation is coked. As in the embodiment described with reference to FIGURE 1, it may be desirable to displace a cokable oil through fracture 42 into the formation before burning the rocket propellant.

In a specific embodiment of this invention, a well is drilled through an incompetent formation and casing set through the interval of the incompetent formation. A horizontal section is milled out of the casing and a small fracture having a calculated radius of 4 feet is made through the opening into the incompetent formation. A capsule having a rocket propellant charge 35 feet long and 7 inches in diameter is run into the hole and suspended with its lower end directly above the fracture 42. The rocket propellant within the capsule is a mixture of a polysulfide rubber and ammonium perchlorate giving a heat release of 3,000 B.t.u.'s per pound of the propellant, which burns at a rate of 0.3 inch per second. The products of combustion of the rocket propellant have substantially the following analysis:

|  | Percent |
| --- | --- |
| CO | 21.1 |
| HCl | 20.1 |
| Nitrogen | 7.6 |
| $CO_2$ | 6.9 |
| Hydrogen | 15 |
| Water | 29.1 |
| Carbon | <0.001 |

Water is displaced down the hole to mix with the combustion products at a rate maintaining the mixture of combustion products and water at a temperature of approximately 1000° F. After the rocket propellant has burned, the capsule is pulled from the well, production tubing is run into the well, and pressure within the tubing is reduced to cause the well to flow.

The process of this invention has the advantage of allowing the coking to be accomplished by means of hot gases of known, non-oxidizing composition. By control of the proportions of oxidant and reductant in the rocket propellant comprising the fuel supplying the heat for the coking reaction, it is possible to avoid both formation of soot which occurs on burning ordinary fuels such as hydrocarbon gases in a deficiency of air and destruction of the coke by contact with the hot oxygen-containing gases. Flow of combustion products through the incompetent formation causes excellent transfer of heat to the incompetent formation to insure coking at a rapid rate and additionally insure the creation of a permeable mass surrounding the borehole of the well.

I claim:

1. A process for consolidating an incompetent oil-bearing formation penetrated by the borehole of a well comprising positioning a container having therein solid rocket propellant in the borehole at a location having access to said incompetent formation, said rocket propellant being adapted to produce by combustion thereof products substantially devoid of oxidizing compounds and of particulate solids, displacing an inert fluid down the well and into the incompetent formation, igniting the rocket propellant whereby said rocket propellant burns to liberate hot gaseous combustion products, maintaining pressure on the well to force the hot combustion products into the formation with the inert fluid, continuing the displacement of said inert fluid, and controlling the rate of displacement of the inert fluid into the well to maintain the temperature of the combustion products and inert fluid displaced into the formation between 500° and 1100° F.

2. A process for consolidating an incompetent oil-bearing formation penetrated by a borehole of a well comprising positioning a capsule containing a rocket propellant and an inert coolant in the borehole at a position having access to the incompetent formation, said rocket propellant being adapted to produce by combustion thereof products substantially devoid of oxidizing materials and particulate solids, blocking the well bore to flow of fluids up the well bore to the well head, igniting the rocket propellant whereby products of combustion of the rocket propellant are displaced into the incompetent formation, and discharging the coolant into the products of combustion at a rate to control the temperature of the resultant mixture of coolant and products of combustion between 500° and 1100° F.

3. A process for consolidating an incompetent subsurface oil-bearing formation that is penetrated by a borehole of a well, said process comprising positioning in the borehole at a location having access to the formation a container having therein a fuel comprising an inert diluent mixed with an oxidant and a reductant in proportions adapted to yield combustion products substantially devoid of oxidizing materials and particulate solids, burning the fuel in the borehole to produce hot combustion products therein, displacing the combustion products into the formation to coke formation oil and thereby bind together particles of the formation, and mixing the diluent with the combustion products in the borehole to maintain the combustion products displaced into the formation at a temperature less than that which causes substantial impairment of the coke binding of the formation particles.

4. A process for consolidating an incompetent subsurface oil-bearing formation that is penetrated by a borehole of a well, said process comprising creating a fracture extending from the borehole into the formation, positioning in the borehole near the fracture a solid fuel comprising an oxidant and a reductant in proportions adapted to yield combustion products substantially devoid of oxidizing materials and particulate solids, burning the fuel in the borehole to produce therein hot combustion products, displacing the hot combustion products from the borehole through the fracture into the formation to heat the formation around the fracture to a temperature at which oil in the formation is coked whereby particles of the formation are bonded together, and maintaining the products of combustion displaced into the formation at a temperature adapted to prevent substantial impairment of the bonding of the formation particles.

5. In an incompetent subsurface oil-bearing formation that is penetrated by the borehole of a well, a process for consolidating the formation by coking the formation oil in situ to deposit a coked bond on the formation particles, said process comprising positioning in the borehole at a location having access to the formation a fuel comprising an oxidant and a reductant in proportions to yield hot combustion products substantially devoid of oxidizing materials thereby preventing impairment of said coked bond by combustion thereof, the proportions of said oxidant and reductant being also such that the combustion products are substantially devoid of particulate solids thereby preventing impairment of the fluid permeability of the coke bond and formation particles, burning the fuel in the borehole to produce therein the hot combustion products, displacing the hot combustion products from the borehole into the formation to heat the formation surrounding the borehole to temperatures at which oil in the formation is coked whereby particles of the incompetent formation are bonded together, and maintaining the products of combustion displaced into the formation at a temperature adapted to prevent substantial impairment of the bonding of the formation particles.

6. A process as set forth in claim 5 in which the fuel is a solid rocket propellant.

7. A process according to claim 5 wherein the products of combustion that are displaced into the formation are maintained at a temperature between 500° F. and 1100° F.

8. In an incompetent subsurface oil-bearing formation that is penetrated by the borehole of a well, a process for consolidating the formation by coking the formation oil in situ to deposit a coked bond on the formation particles, said process comprising positioning in the borehole at a location having access to the formation a solid fuel mixture containing an oxidant and a reductant in proportions to yield hot combustion products substantially devoid of oxidizing materials thereby preventing impairment of said coke bond by combustion thereof, the proportions of said oxidant and reductant being also such that the combustion products are substantially devoid of particulate solids thereby preventing impairment of the fluid permeability of the coke bond and formation particles, burning the fuel in the borehole to produce hot combustion products therein, displacing said combustion products into the formation to heat the formation to a temperature at which oil in the formation is coked on particles of the formation to bind them together, and maintaining the combustion products displaced into the formation at a temperature adapted to prevent substantial impairment of the coke bonding of the formation particles.

9. A process as set forth in claim 8 in which the reductant is selected from the group consisting of polysulfide synthetic rubbers, polyurethanes, polyvinyl chloride, polyethylene, polyesters and synthetic rubbers and the oxidant is selected from the group consisting of ammonium perchlorate and ammonium nitrate.

References Cited by the Examiner
UNITED STATES PATENTS

| | | | |
|---|---|---|---|
| 2,828,821 | 4/1958 | Waterman | 166—57 |
| 2,931,437 | 4/1960 | Smith | 166—39 X |
| 2,987,298 | 6/1961 | Walker et al. | 166—29 |
| 2,997,104 | 8/1961 | Burch | 166—57 |
| 3,003,555 | 10/1961 | Freeman et al. | 166—11 X |
| 3,090,435 | 5/1963 | Kerver et al. | 166—29 |

JACOB L. NACKENOFF, *Primary Examiner.*

BENJAMIN HERSH, CHARLES E. O'CONNELL, *Examiners.*

T. A. ZALENSKI, *Assistant Examiner.*